Patented Jan. 12, 1943

2,307,893

UNITED STATES PATENT OFFICE 2,307,893

PROCESS FOR THE MANUFACTURE OF LEUCO ESTERS

Walter Mieg, Opladen, and Franz Wieners, Cologne-Stammheim, Germany, assignors to General Aniline & Film Corporation, New York, N. Y., a corporation of Delaware No Drawing. Application November 25, 1939, Serial No. 306,118. In Germany November 28, 1938

6 Claims. (Cl. 260—691)

Water soluble esters from leuco vat dyestuffs and organic acids have been described in the U. S. patent specification 1,878,964. Their manufacture was effected by causing a leuco derivative of a vat dyestuff to react with a benzoic acid sulfohalide in the presence of a tertiary heterocyclic base. This process is not of practical importance as the separation and drying of the leuco compound is necessary which in many cases due to its instability makes the esterification difficult.

The present invention deals with an improved process for the manufacture of water soluble leuco esters of organic acids. We have found that esters of this kind are obtained in a very simple and convenient manner by treating leuco compounds of vat dyestuffs in the aqueous vat with organic acylating agents in the presence of polyethylene oxides. The term "polyethylene oxides" is intended to cover polyethylene oxides as such as well as condensation products from ethylene oxide or polyethylene oxides and, for instance, compounds containing hydroxylic groups. Advantageously used are polyglycol ethers and derivatives thereof containing about 20 and more ethylene oxide radicals.

As suitable acylating agents may be mentioned monohalides and anhydrides of aromatic sulfo carboxylic acids, as for instance the monochlorides of m- and p-sulfobenzoic acid and the monochlorides of sulfonaphthoic acids and sulfodiphenyl carboxylic acids. When working with anhydrides preferably the intra-molecular anhydrides are employed. Furthermore, aromatic sulfochloride sulfonic acids as, for instance, naphthalene sulfochloride sulfonic acids, are useful. Also dichlorides or anhydrides of aromatic or aliphatic dicarboxylic acids, respectively, such as isophthaloylchloride, terephthaloylchloride, adipinic acid chloride or benzene disulfonic acid chloride come into consideration.

In case of using dichlorides of dicarboxylic acids the acid halide group which does not take part in the esterification is simultaneously saponified.

The reaction may be carried out in the following manner: The dyestuff is vatted advantageously in the presence of the condensation product to be used and after adding the necessary amount of the acylating agent the reaction mixture is stirred with the exclusion of air until formation of the ester has been completed. In most cases we have chosen a temperature below about 15°. The separation of the esters may be effected by salting out, for instance, with sodium chloride, ammonium sulfate or bisulfite or other salts. However, in principle, the solutions may be used, as such, for dyeing purposes.

The esters obtained are split off to the starting dyestuffs in an acid as well as in an alkaline medium, which decomposition is enhanced by adding an oxidizing agent. The esters are to be used for dyeing and printing purposes, also for dyeing artificial materials.

The process is more fully illustrated by the following examples, without being limited thereto, the parts being by weight.

Example 1

40 parts of a 10% paste of dibenzanthrone are stirred with 120 parts of water and 40 parts of a 20% aqueous solution of the condensation product are added obtained from 1 mol oleyl alcohol and about 20 mols of ethylene oxide. At 50–60° 10 parts of concentrated sodium hydroxide solution (35%) and 3 parts of sodium hydrosulfite are added. The blue vat is cooled down to 5°, 6 parts of powdered o-sulfobenzoic acid anhydride are added and the mixture is stirred, while avoiding the access of air. The color of the solution turns brown, while preserving its caustic alkaline reaction and the solution becomes insensitive to the oxygen of the air. As soon as no unchanged starting dyestuff can be detected, which is the case after 10–20 minutes, the ester is separated by adding gradually common salt and filtering. Conveniently, the product is dissolved again in water of a temperature of 0–5° C., filtered if necessary and salted out again, while the solution may be acid or alkaline. The ester, separated by being sucked off, dissolves in water with a clear yellowish brown color. The blue starting dyestuff is separated by adding mineral acid and an oxidizing agent, after a short time of standing, or by adding sodium hydroxide solution and hydrogen peroxide at slight heating in the water bath.

Example 2

At room temperature a vat is prepared from 80 parts of a 2.5% paste of Bz-2, Bz-2'-dimethoxy-dibenzanthrone, 15 parts of a sodium hydroxide solution (30%), 1.8 parts of sodium hydrosulfite and 20 parts of a 20% aqueous solution of the condensation product of 1 mol oleyl alcohol and about 20 mols ethylene oxide. While stirring this mixture well 10 parts of benzoic acid-m-sulfochloride (monochloride) are added in small portions at about 0°, and the mixture is stirred again at the same temperature, while avoiding the access of air, until a dark red solution has been formed and a test portion of it remains red, when soda or dilute caustic soda is added.

The leuco ester obtained can be separated by salting out, suitably after neutralizing the solution by adding bicarbonate. It dissolves in water and dilute alkalies, respectively, with a dark red color and can be reconverted into the starting dyestuff with acids or alkalies in the presence of oxidizing agents, for instance with dilute sulfuric acid containing nitrite or with caustic soda and hydrogen peroxide.

Instead of sodium hydroxide solution ammonia can be used for the preparation of the vat.

*Example 3*

4 parts of the polyglycol condensation product mentioned in Example 1 are dissolved in 100 parts of a 2% paste of Bz-2, Bz-2'-dimethoxydibenzanthrone, 8 parts of sodium hydroxide solution (30%) and 1.5 parts of sodium hydrosulfite are added and the mixture is heated to 50°. The blue vat obtained is at once cooled down to 10° and 3 parts of o-sulfobenzoic acid dichloride are gradually added, while stirring. The mixture is stirred strongly at about 12° with exclusion of air, until a dark red solution has formed, the color of which does not become more bluish, when sodium hydroxide solution is added. Working up may be performed by neutralizing the solution—if necessary with a dilute acid—and salting out the leuco ester. The ester may also be precipitated with a concentrated solution of sodium bisulfite.

The leuco ester dissolves in water with a brownish red color. It may be decomposed in an acid as well as an alkaline medium, especially easily in the presence of an oxidizing agent.

This leuco ester can also be obtained when in the process described in this example the condensation products from about 40 mols ethylene oxide and 1 mol abietinole or 1 mol castor oil, respectively, instead of the condensation product from oleyl alcohol and ethylene oxide are used.

*Example 4*

A vat is produced from dibromanthanthrone which in 100 parts contains 2 parts of dyestuff, 4 parts of the condensation product from 1 mol oleyl alcohol and about 20 mols ethylene oxide, 1.5 parts of hydrosulfite and 1.5 parts of sodium hydroxide. 3 parts of o-sulfobenzoic acid anhydride are added at 3° C. to this violet vat, and the mixture is stirred while avoiding an oxidation by means of air. Rising of the temperature to about 10° is allowed. After about one hour the mixture is filtered from possible impurities, slightly acidified and salted out. A yellow ester is obtained which dissolves easily in water when heated. The starting dyestuff is obtained from this solution when an acid and an oxidizing agent are added.

*Example 5*

10 parts of a 20% paste of Bz-2, Bz-2'-dimethoxydibenzanthrone with 4 parts of polyethyleneoxide and 5.3 parts of sodium hydroxide solution are made up with water to 100 parts. After the addition of 1.5 parts of sodium hydrosulfite the mixture is stirred slowly at about 60° until the dyestuff is completely vatted. Now the solution is cooled down to 0°, 3.2 parts of o-sulfobenzoic acid anhydride are added and while the mixture is stirred, rising of the temperature is allowed to about 10°. The blue vat changes into the red solution of the leuco ester which also shows a caustic alkaline reaction. The end of the esterification may be recognized by the fact, that a test portion does not oxidize when shaken in contact with air. The leuco ester is salted out with common salt. In order to purify the product which is already very pure it is dissolved again in ice-cold water, the solution is acidified with sulfuric acid, filtered and the filtrate salted out again. The ester separated in the usual way is stable on exposure to air and dissolves in water with a brownish red color. By adding acid and bichromate it is quickly reconverted into the green starting dyestuff, by adding alkali and hydrogen peroxide it is reconverted likewise, but a little slower.

*Example 6*

1 part of finely powdered 1-benzoylamino anthraquinone and 1 part of sodium hydrosulfite are introduced into 100 parts of a 1.2% sodium hydroxide solution and the mixture is heated to about 45° until the dyestuff is completely vatted. When 15 parts of a 20% aqueous solution of the polyglycol derivative mentioned in Example 1 are added, the temperature is cooled down to 10° and 2 parts of finely powdered o-sulfobenzoic acid anhydride are stirred in. With exclusion of air the mixture is stirred strongly at about 10° until the color of the solution, which was purple-red at the beginning, has become brown-yellow and a test portion does not change its color when added to dilute, cold sodium hydroxide solution, even when sodium hydrosulfite is present.

The produced leuco ester can be salted out, for instance, by the addition of common salt, in order to separate it. It dissolves in dilute sodium hydroxide solution with an orange-yellow color and is split off by acids as well as by alkalies.

*Example 7*

40 parts of a 5% suspension of Bz-2, Bz-2'-dimethoxydibenzanthrone, 60 parts of water and 4 parts of the condensation product of 1 mol castor oil and about 40 mols ethylene oxide are vatted with 5.3 parts of sodium hydroxide solution (34%) and 1.5 parts of sodium hydrosulfite at about 60°. The vat is cooled down to 10° and with the addition of 3.2 parts of finely powdered o-sulfobenzoic acid anhydride stirred at this temperature in the absence of the oxygen of the air. The alkaline reaction remains, the solution which was blue in the beginning turns into red after a short time. By taking out test portions one makes sure, whether the esterification is complete. The ester is separated as indicated above. Properties and the capability of being split off correspond to those of the product obtained according to Example 5.

*Example 8*

1 part of flavanthrone is suspended in 250 parts of a 2.4% aqueous solution of the same condensation product of ethylene oxide as used in Example 1 and vatted at 40–50° C. by addition of 2.7 parts of concentrated sodium hydroxide solution and 1 part of sodium hydrosulfite. The blue vat is cooled down to about +5°, 1.6 parts of o-sulfobenzoic acid anhydride are added and the temperature is left for about 30 minutes at 5–10°, while avoiding the access of air and stirring well. The reaction remains slightly alkaline. The partly precipitated ester is separated completely by adding common salt. It is sucked off and after washing and carefully drying it a dark blue powder is obtained which dissolves in water with difficulty, but when added to sodium hydroxide solution it dissolves with a violet color. The solution of the leuco ester is stable when it is shaken in contact with air in the cold. In the heat, especially when oxidizing agents are added, flavanthrone is gradually separated. In an acid medium the ester is more easily oxidized to the dyestuff.

Example 9

A purple-red vat is obtained by heating shortly to about 50° a mixture consisting of 2 parts of dibenzpyrenequinone, 100 parts of water, 5 parts of sodium hydroxide solution (35%), 2 parts of sodium hydrosulfite and 16 parts of a 20% aqueous solution of the derivative of ethylene oxide used in Example 1. When cooled down to 8° a solution of 5 parts of isophthalic acid chloride in 3 parts of dioxane is added gradually while stirring and the mixture is stirred for some time with the exclusion of air at 8–10°. By adding from time to time soda or sodium hydroxide solution the mixture is kept just alkaline. When a test portion in dilute sodium hydroxide solution does not show any longer a red, but a yellow-brown color the produced leuco ester can be separated, for instance, by acidifying the ice-cooled mixture slightly with dilute hydrochloric acid and precipitating it in form of orange-yellow flakes by adding common salt. The solubility of the ester in dilute alkalies apparently is due to the fact, that only one COCl-group of the isophthalic acid chloride takes part in the formation of the ester, while the other one after saponification causes the solubility.

The leuco ester is saponified by heating it in dilute alkalies. Splitting off to the dibenzpyrenequinone takes place with special facility in dilute mineral acid with the addition of nitrite or other suitable oxidizing agents.

In a similar manner other vat dyestuffs, as for instance 4,3'.5'-trichloranthraquinone-2.1-(N)-1'.2'-(N)-benzeneacridone and anthraquinone-2.1-(N)-1'.2'-(N)-naphthacridone can be converted into the corresponding leuco esters which show a similar behavior against alkalies and acids.

Example 10

In the same manner as described in Example 1 a vat is produced from Bz-2, Bz-2'-dimethoxy-dibenzanthrone with addition of the same quantity of the polyglycol derivative. The mixture is cooled down to –5° C. While stirring and cooling well 10 parts of naphthalenesulfochloride sulfonic acid (obtainable according to specification of U. S. application Ser. No. 204,390, which is now U. S. Patent No. 2,215,083, issued September 17, 1940 are added in portions at such a rate that the temperature does not rise very much above 0° C. and stirring is continued with the exclusion of air. After a short time a red solution is obtained. When a test portion does not change its red color when sodium hydroxide solution is added the formation of the ester is finished. The ester is separated by salting out. It dissolves very easily in water with a brownish red color. It is split off by dilute mineral acid in the presence of sodium nitrite already in the cold. It is rather stable against cold, dilute sodium hydroxide solution. When the sodium hydroxide solution is heated the ester is split off to the starting dyestuff, with special facility when hydrogen peroxide is added.

We claim:

1. A process which comprises treating leuco compounds of vat dyestuffs in the aqueous vat with an organic acylating agent selected from the class consisting of halides and anhydrides of polybasic organic sulfonic acids, of polybasic organic carboxylic acids and of polybasic organic sulfocarboxylic acids, in the presence of a member of the group consisting of polyethylene oxide and the condensation products obtained from a member of the group consisting of ethylene oxide and polyethylene oxide with a high molecular weight compound containing an aliphatic hydroxyl group.

2. The process as defined in claim 1 wherein the leuco compounds of vat dyestuffs are leuco compounds of anthraquinone vat dyestuffs.

3. The process as defined in claim 1 wherein the organic acylating agent is a benzene acylating agent.

4. The process as defined in claim 1 wherein the high molecular weight compound containing an aliphatic hydroxyl group contains at least 18 carbon atoms.

5. A process which comprises treating leuco compounds of vat dyestuffs in the aqueous vat with an organic acylating agent selected from the class consisting of halides and anhydrides of polybasic organic sulfonic acids, of polybasic organic carboxylic acids and of polybasic organic sulfocarboxylic acids, in the presence of polyglycol ethers containing at least 20 ethylene oxide radicals.

6. The process as defined in claim 5 wherein the leuco compounds of vat dyestuffs are leuco compounds of anthraquinone vat dyestuffs.

WALTER MIEG.
FRANZ WIENERS.